INVENTOR.
Robert O. Woods
BY

Attorney

United States Patent Office 3,555,411
Patented Jan. 12, 1971

3,555,411
COLD CATHODE MAGNETRON IONIZATION
GAUGE WITH CATHODES FORMING POLE
PIECES FOR CYLINDRICAL MAGNET
Robert O. Woods, Albuquerque, N. Mex., assignor to the
United States of America as represented by the United
States Atomic Energy Commission
Filed Feb. 14, 1969, Ser. No. 799,166
Int. Cl. G01n 27/62
U.S. Cl. 324—33                                3 Claims

ABSTRACT OF THE DISCLOSURE

A cold cathode magnetron ionization gauge for measuring very low pressures, particularly in environments subject to high acceleration and vibration conditions. Magnetic flux for influencing the path of electrons is provided by means of a hollow magnet entirely enclosed within the gauge cavity. The location of the magnet and the position and configuration of a pair of cathodes is such that a maximum portion of the available flux is confined to the useful internal volume of the gauge. This construction ensures that magnetic flux closing outside the gauge is held to a minimum.

BACKGROUND OF THE INVENTION

Various types of ionization gauges have been employed for measuring very low pressures. This invention is particularly concerned with an improvement in the cold cathode type of ionization gauge sometimes referred to as a discharge vacuum gauge. This type of gauge employs an anode and either one or two cathodes located in a vacuum tight housing with a conduit for connection to an external vacuum environment. A high potential is connected across the anode and cathode. An electrometer is usually connected between cathode and ground potential for measuring current changes proportional to pressure. To increase the sensitivity of a cold cathode ionization gauge permanent magnets are employed to introduce a magnetic field which lengthens the effective electron path between anode and cathode. These large, usually toroidal magnets are located outside the ionization gauge housing, and thus must provide a field volume substantially larger than the active portion of the gauge, because of the large percentage of the field coupled outside the gauge. Furthermore, under certain circumstances the resultant external magnetic field is highly undesirable. For example, it can seriously affect the performance of other sensitive instruments packed closely to the ionization gauge as, for example, in the nose of a high altitude rocket.

Ionization gauges constructed for use in the laboratory commonly employ relatively fragile supporting techniques for the anode and cathode elements. An ionization gauge so constructed will not be sufficiently rugged to withstand high acceleration and vibration forces such as may be experienced in high altitude rocket experiments.

SUMMARY OF INVENTION

It is therefore an object of this invention to provide a cold cathode magnetron ionization gauge in which the magnetic flux is substantially confined to the internal vacuum cavity of the gauge housing.

It is a further object of this invention to provide a cold cathode magnetron ionization gauge which is constructed to withstand high acceleration and vibration environments.

Included within the scope of this invention is a cold cathode magnetron ionization gauge in which the important operative elements are housed within a sealed, generally cylindrical housing provided with suitable connection to an external vacuum environment. A permanent magnet completely enclosed within the internal gauge cavity is combined with a pair of cathodes such that they constitute pole pieces of a magnetic circuit coupled through a hollow anode positioned between the cathodes. This reduces the required magnetic flux and confines it more closely to the useful portion of the instrument. The anode and cathodes are supported for maximum resistance to acceleration and vibration conditions.

DESCRIPTION OF THE PREFERRED EMBODIMENT

Figure 1:
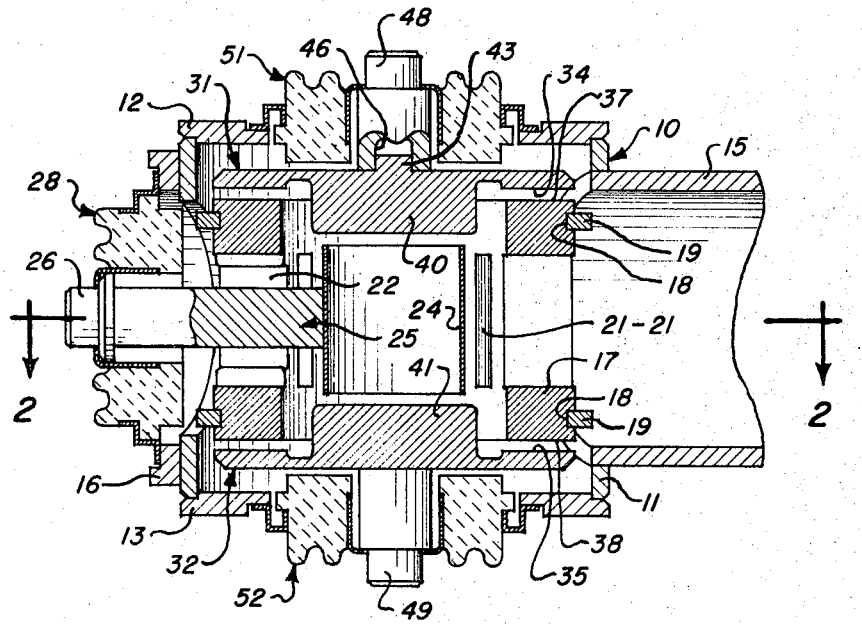
FIG. 1 is a sectional view in elevation taken on line 1—1 in FIG. 2.
Figure 2:
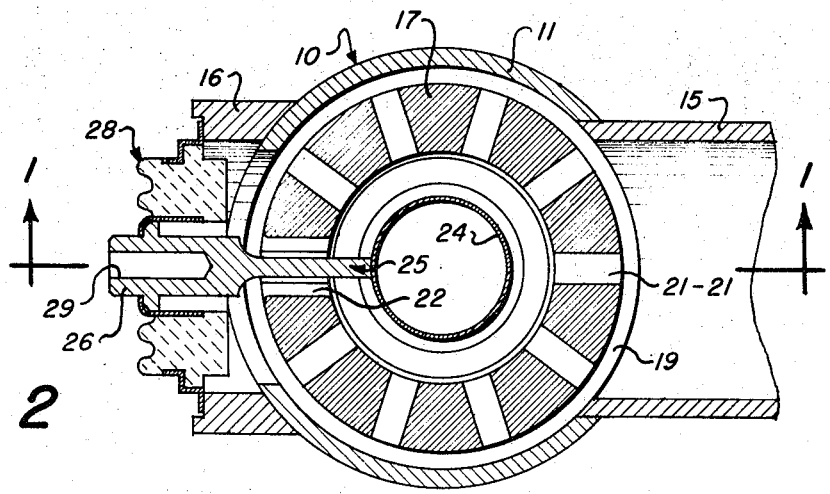
FIG. 2 is a plan view taken on line 2—2 in FIG. 1.

Attention is now directed to FIGS. 1 and 2. The operative elements of this magnetron ionization gauge are generally confined within a vacuum cavity formed by a substantially cylindrical housing 10, preferably of nonmagnetic stainless steel or other nonmagnetic material. Vacuum and electrical connections to internal gauge elements to be described may be made through two apertures in a cylindrical casing 11 of the housing 10 and through two end caps 12 and 13 positioned and suitably fastened at opposite ends of the casing 11.

To conveniently connect the ionization gauge to an external vacuum environment, a conduit 15 may be rigidly attached to the casing 11 around the periphery of one of the apertures therein by suitable means such as brazing. The conduit 15 should be given a substantial bore to provide for maximum transfer of molecules from the external environment to the internal gauge cavity and should be constructed of a metal similar to that of the housing 10 to insure ease of joining and structural strength. A support ring 16 positioned generally opposite the conduit 15 may be shaped to conform to the casing 11 and may also be rigidly attached thereto around the periphery of the other aperture by any suitable means.

A hollow cylindrical permanent magnet 17 may be positioned at a generally central location within the gauge cavity. The magnet 17 may be provided with a plurality of lateral grooves 18 formed in the outer periphery thereof and adapted to accommodate a similar plurality of split rings, 19, which are snapped tightly therein. The magnet 17 may then be conveniently fastened in place with respect to the housing 10 by attaching the split rings 19 to the inner cylindrical surface of the casing 11 by suitable means such as brazing. The split rings 19 may be of any nonmagnetic metal although a material similar to that of housing 10 is preferred.

The magnet 17 is also provided with a plurality of similar radial slots 21—21 spaced apart and extending from the inner to the outer cylindrical surface of the magnet 17. The slots 21—21 are preferably of narrow rectangular cross section longitudinally aligned with the axis of the magnet 17 for minimum magnetic field interference, and provide a means for venting the interior of the vacuum cavity to an external environment through the conduit 15. A radial slot 22 also extends from the inner to the outer cylindrical surface of the magnet 17 and is generally aligned with the axis of the support ring 16. The slot 22 is provided with a bore which may be preferably somewhat larger than that of the slots 21—21 for reasons to be described below.

A hollow cylindrical anode 24, preferably constructed of thin wall nonmagnetic stainless steel, may be longitudinally centered within the magnet 17 and supported coaxially therewith. The anode 24 is held rigidly in place by means of a conductive rod 25 which extends through the radial slot 22. The conducting rod 25 may conveniently have a rectangular cross section and is physically separated at all points by a predetermined minimum distance from the material of the magnet 17 as it passes through the slot 22. The inner bore of the slot 22 is therefore designed to conform with this requirement. Opposite the anode 24 the rectangular conductive rod 25 enlarges to form a solid rod, the external portion of which becomes the terminal 26.

The anode terminal 26 is electrically sealed within a conventional insulative feedthrough assembly 28 which is, in turn, rigidly attached as by brazing or other suitable means to the support ring 16. The insulative material of the feedthrough assembly 28 may be porcelain, but other substances may be used provided they constitute a good dielectric at high voltage potentials. The anode terminal 26 is provided with an internal bore 29 through which suitable connections may be made to an external high voltage power supply. A pair of similar, generally disc-shaped cathodes 31 and 32 of magnetic material and conveniently nickel-plated, are supported and positioned facing the two ends of the magnet 17. The cathodes 31 and 32 are provided with outer annular flat surfaces 34 and 35 which are respectively separated by predetermined air gaps from flat surfaces 37 and 38 of the magnet 17. The inner and outer diameters of the surfaces 34 and 35 are substantially the same as the inner and outer diameters of the surfaces 37 and 38. The cathodes 31 and 32 are provided respectively with inwardly directed circular bosses 40 and 41 extending toward the two respective ends of the anode 24. FIG. 1 shows that the cathode 31 is provided with an outwardly directed boss 43 which extends within and is fastened to an inner bore 46 of the tubular cathode terminal 48. A similar boss (not shown) on the cathode 32 extends within and is fastened to the cathode terminal 49. The cathode terminals 48 and 49 are hermetically sealed within a pair of conventional feedthrough assemblies 51 and 52 which are, in turn, rigidly attached by suitable means to the respective end caps 12 and 13 to form a tight seal.

Figure 3:
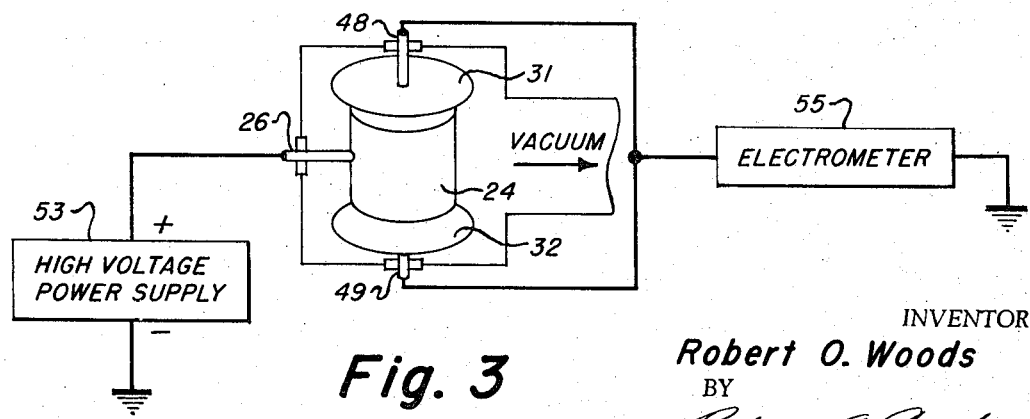
FIG. 3 is a schematic of the ionization gauge circuit.

FIG. 3 shows a schematic diagram of a pressure measuring system of which the ionization gauge of the invention, represented here simply by the anode 24 and the cathodes 31 and 32, forms a part. The anode 24 is connected to the positive terminal of the high voltage power supply 53 through the anode terminal 26. The cathodes 31 and 32 are externally connected in parallel through the cathode terminals 48 and 49 to the electrometer 55 which is also returned to ground to complete the circuit.

The basic mode of operation of a cold cathode magnetron ionization gauge of the type described herein is well understood. A discharge is maintained within the gauge such that neutral gas molecules introduced within the gauge cavity are ionized within a plasma. This is commonly known in the art as a Penning discharge. The resulting positive gas ions are attracted to the gauge cathodes and represent ion current which is a measure of the molecular density of the external environment under examination. At a given temperature this density is proportional to gas pressure. The presence of a suitably directed magnetic field in the space between the cathodes and the anodes lengthen the effective electron path and thereby increases the probability of collision with gas molecules sufficiently to sustain the discharge at very low pressures.

The only portion of the magnetic field in the gauge described herein which contributes to this basic mode of operation is that which is made up of parallel flux lines passing axially through the center of anode 24. Consequently it is important to confine the maximum portion of the available magnetic flux to this inner anode space. Calculations show that when a toroidal magnet surrounds an ionization gauge housing of the type known in the prior art, up to 60 percent of its available flux closes around the outside of the magnet. By confining the magnet 17 entirely within the gauge cavity, it is possible to position such magnet closer to the anode 24 and also to use the cathodes 31 and 32 as pole pieces in the magnetic circuit. In an actual comparison between a prior art magnetron ionization gauge employing a 1000 gauss permanent toroidal magnet mounted on the exterior of the gauge housing with the gauge of the present invention, also employing a 1000 gauss magnet, significant differences exist in the field strength external to the instrument. For example, at a distance of 4 cm. from the outer periphery of the gauge housing 10 of this invention the field strength was an order of magnitude less than at the same distance from the outer surface of the externally mounted magnet of the prior art. This enables the positioning of sensitive instrumentation much closer, therefore, to the housing 10 than would otherwise be possible and avoids undesirable magnetic perturbation of such instruments. The gauge described herein has the added advantage, of course, that it may be made more compact and lighter.

A potential difference typically of about 2 kilovolts is normally maintained between the anode 24 and each of the cathodes 31 and 32. The separation between the bosses 40 and 41 and the respective ends of the anode 24 is reduced as far as possible consistent with avoidance of field ionization currents directly between these electrode portions. Consistent with this requirement and the overall geometry of the device, the closer the bosses 40 and 41 may be positioned with respect to each other, the more effective will be the function of the cathodes 31 and 32 as magnetic circuit pole pieces.

The annular surfaces 34 and 35 of the cathodes 31 and 32 are separated from the surfaces 37 and 38 of the magnet 17 by a small air gap. Actual contact at these points might, of course, short circuit the electrometer 55.

Positioned and formed as described herein, it will be seen that cathodes 31 and 32 serve not only as the negative electrodes of the ionization gauge but also constitute an integral part of the magnetic circuit. The result is that a large percentage of the available magnetic flux is coupled through the center of the anode 24 within which the flux lines are maintained substantially parallel. This, of course, enables the magnet to function with maximum efficiency in lengthening the effective length of travel of electrons within the gauge.

A typical application for the gauge of the invention is to measure ambient pressure at altitudes in excess of 300,000 feet. In such an application the gauge may be mounted in a nose cone of a missile together with other sensitive instruments which, because of space limitations, are in close proximity to the gauge. The electrometer 55 may under these circumstances be replaced with a sensitive transducer connected to a telemetering transmitter. The telemetered information received at a ground station may be translated into pressure. The device has proved capable of measuring ion currents between $10^{-3}$ and $10^{-8}$ amperes which would correspond respectively to pressures between $10^{-3}$ and $10^{-8}$ torr.

Applications such as described herein necessarily involve high forces of acceleration and vibration. The thin, relatively long, cantilevered struts commonly employed in prior art gauges for electrode support are now eliminated. Note that the anode 24 is in direct contact with the rigid, integral member composed of conductive rod 25 and the anode terminal 26. Also, the cathodes 31 and 32 through their outwardly directed bosses such as boss 43 are in direct contact with the cathode terminals 48 and 49. The absence of intervening struts in this electrode support geometry contributes importantly to the overall ruggedness of the instrument.

It will be understood that various changes in the details, materials and arrangements of parts, which have been herein described and illustrated in order to explain the nature of the invention, may be made by those skilled in the art within the principle and scope of the invention as expressed in the appended claims.

What is claimed is:
1. A cold cathode magnetron ionization gauge for measuring the pressure of an external environment comprising:
- a sealed non-magnetic housing having an internal cavity,
- a hollow cylindrical anode supported within said cavity,
- a hollow cylindrical permanent magnet within said cavity coaxially surrounding said anode and having its inner surface coextensive and in spaced radial relation with said anode with the magnetic poles at the ends thereof,
- a pair of generally disc-shaped equipotential magnetizable and electrically conductive cathode means positioned in spaced electrically isolated relation to the two ends of said magnet respectively, substantially of equal outer diameter and forming facing magnetic pole pieces therewith for concentrating and focusing the magnetic flux therebetween within said hollow anode, and spaced from the ends of the anode at a predetermined distance,
- means for venting said cavity to said external environment, and
- means for applying a predetermined potential between each of said cathode means and said anode.

2. A device as in claim 1 wherein each of said cathode means is provided with an outer annular flat surface in spaced electrically isolated facing relation to an end of said magnet and of equal inner and outer diameter therewith and an inwardly directed central cylindrical boss extending toward said anode and having substantially equal diameter therewith.

3. A device as in claim 1 wherein said magnet is provided with a plurality of radially directed slots of narrow cross section aligned with the axis of said magnet extending from its inner to its outer surface, one of said plurality of slots being aligned with a conductive support rod extending therethrough and separated therefrom, one end of said rod being affixed to said anode and the other end of said rod extending externally of said housing to form an anode terminal.

References Cited

UNITED STATES PATENTS

| | | | |
|---|---|---|---|
| 2,745,059 | 5/1956 | Gauger | 324—33 |
| 2,855,533 | 10/1958 | Morgan | 324—33X |
| 3,280,365 | 10/1966 | Young | 324—33X |
| 3,280,619 | 10/1966 | Spies | 324—33X |
| 3,324,729 | 6/1967 | Vanderslice | 324—33UX |
| 3,355,587 | 11/1967 | Jenckel | 324—33X |
| 3,379,967 | 4/1968 | Herrwerth et al. | 324—33 |
| 3,435,334 | 3/1969 | Helmer | 324—33 |
| 3,493,807 | 2/1970 | Tallon et al. | 324—33X |

FOREIGN PATENTS

| | | | |
|---|---|---|---|
| 754,515 | 8/1956 | Great Britain | 313—7.5 |

GERARD R. STRECKER, Primary Examiner

U.S. Cl. X.R.

313—7, 153